United States Patent
Gray

(10) Patent No.: US 10,683,206 B2
(45) Date of Patent: Jun. 16, 2020

(54) PROCESS FOR CARRYING OUT AN EQUILIBRIUM LIMITED REACTION

(71) Applicant: JOHNSON MATTHEY DAVY TECHNOLOGIES LIMITED, London (GB)

(72) Inventor: Julian Stuart Gray, London (GB)

(73) Assignee: Johnson Matthey Davy Technologies Limited, London (GB)

(*) Notice: Subject to any disclaimer, the term of this patent is extended or adjusted under 35 U.S.C. 154(b) by 0 days.

(21) Appl. No.: 15/566,471

(22) PCT Filed: Mar. 24, 2016

(86) PCT No.: PCT/GB2016/050858
§ 371 (c)(1),
(2) Date: Oct. 13, 2017

(87) PCT Pub. No.: WO2016/166507
PCT Pub. Date: Oct. 20, 2016

(65) Prior Publication Data
US 2018/0086637 A1 Mar. 29, 2018

(30) Foreign Application Priority Data

Apr. 17, 2015 (GB) .................................. 1506572.5

(51) Int. Cl.
*B01J 8/06* (2006.01)
*B01J 8/04* (2006.01)
(Continued)

(52) U.S. Cl.
CPC ............... *C01B 17/74* (2013.01); *B01J 8/025* (2013.01); *B01J 8/0469* (2013.01); *B01J 8/067* (2013.01);
(Continued)

(58) Field of Classification Search
CPC ... B01J 8/06; B01J 8/067; B01J 8/0426; B01J 8/043; B01J 8/0434; B01J 8/048;
(Continued)

(56) References Cited

U.S. PATENT DOCUMENTS 1,945,811 A * 2/1934 Jaeger ................... C01B 17/765
422/216
2,310,907 A 2/1943 Mcmillan
(Continued)

FOREIGN PATENT DOCUMENTS

| CN | 101622068 A | 1/2010 |
|---|---|---|
| GB | 1417462 A | 12/1975 |

(Continued)

OTHER PUBLICATIONS

GB1605088.2; Combined Search and Examination Report Under Sections 17 and 18(3) dated Oct. 31, 2016.
(Continued)

*Primary Examiner* — Lessanework Seifu
(74) *Attorney, Agent, or Firm* — BakerHostetler

(57) ABSTRACT

A reactor having a shell comprising: one or more reactor tubes located within the shell, said reactor tube or tubes comprising a plurality of catalyst receptacles containing catalyst; means for providing a heat transfer fluid to the reactor shell such that the heat transfer fluid contacts the tube or tubes; an inlet for providing reactants to the reactor tubes; and an outlet for recovering products from the reactor tubes; wherein the plurality of catalyst receptacles containing catalyst within a tube comprises catalyst receptacles containing catalyst of at least two configurations.

15 Claims, 8 Drawing Sheets

(51) Int. Cl.
  *C01B 17/74* (2006.01)
  *B01J 19/24* (2006.01)
  *B01J 8/02* (2006.01)

(52) U.S. Cl.
  CPC .. *B01J 19/2485* (2013.01); *B01J 2208/00168* (2013.01); *B01J 2208/00212* (2013.01); *B01J 2208/00814* (2013.01); *B01J 2208/025* (2013.01); *B01J 2219/00094* (2013.01); *B01J 2219/2411* (2013.01); *B01J 2219/2432* (2013.01); *B01J 2219/2443* (2013.01)

(58) Field of Classification Search
  CPC ............... B01J 19/2425; B01J 19/2485; B01J 2208/0084; C01B 17/74; C01B 17/765; C01B 17/803
  See application file for complete search history.

(56) References Cited

U.S. PATENT DOCUMENTS

| | | | | |
|---|---|---|---|---|
| 2,353,509 | A | * | 7/1944 | Schulze ................. B01J 8/0453 208/130 |
| 5,130,098 | A | * | 7/1992 | Zardi .................... B01J 8/0415 422/148 |
| 5,741,475 | A | * | 4/1998 | Takashima ............. B01J 8/0438 423/533 |
| 8,202,814 | B2 | | 6/2012 | Dieterle et al. |
| 2005/0049435 | A1 | | 3/2005 | Ha et al. |
| 2011/0008218 | A1 | | 1/2011 | Woo et al. |
| 2012/0277331 | A1 | | 11/2012 | Gamlin et al. |
| 2014/0107235 | A1 | | 4/2014 | Gamlin |
| 2014/0187653 | A1 | | 7/2014 | Gamiin |

FOREIGN PATENT DOCUMENTS

| | | |
|---|---|---|
| WO | WO2011048361 A1 | 4/2011 |
| WO | WO2012136971 A1 | 10/2012 |
| WO | WO2015114345 A1 | 8/2015 |
| WO | WO2015132555 A1 | 9/2015 |

OTHER PUBLICATIONS

PCT/GB2016/050858, International Search Report dated Jun. 22, 2016.
PCT/GB2016/050858, Written Opinion dated Jun. 22, 2016.

* cited by examiner

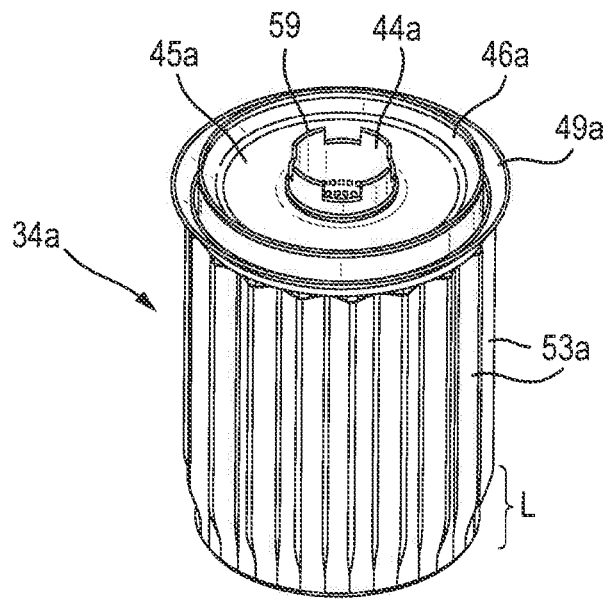
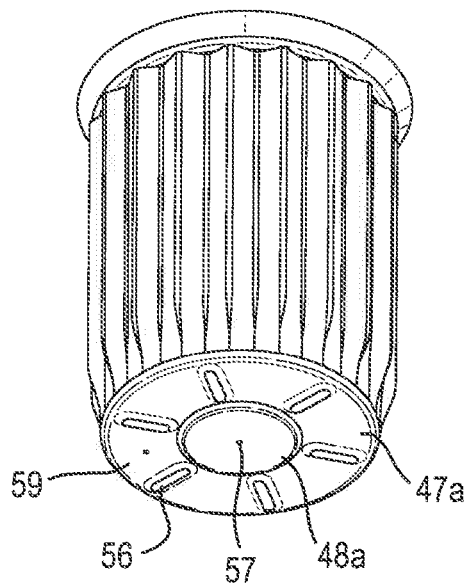
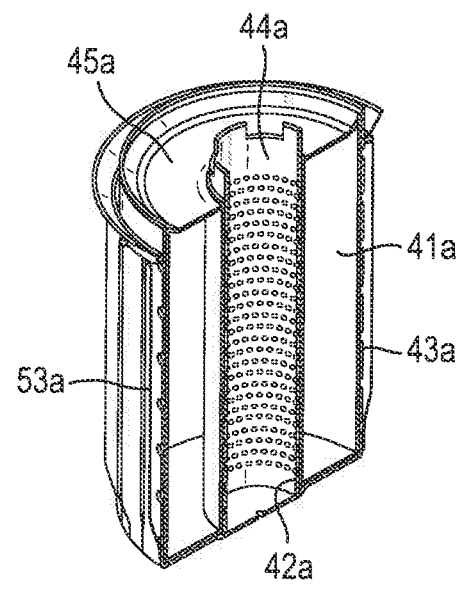

Detail A

PROCESS FOR CARRYING OUT AN EQUILIBRIUM LIMITED REACTION

CROSS-REFERENCE TO RELATED APPLICATIONS

This application is the National Stage of International Patent Application No. PCT/GB2016/050858 filed Mar. 24, 2016, which claims priority from Great Britain Patent Application No. 1506572.5 filed Apr. 17, 2015, the disclosures of each of which are incorporated herein by reference in their entirety.

The present invention relates to a process for carrying out equilibrium limited reactions in the presence of a heterogeneous catalyst. More particularly, it relates to a process in which the temperature is controlled and the process is optimised. Still more particularly, it relates to a process for producing sulphur trioxide.

Many chemical reactions are reversible. In these reactions the forward reaction of the reactants to the desired product is accompanied by a reverse reaction in which the desired product reverts to the reactants. These processes will reach equilibrium where the rate of forward reaction matches the rate of the reverse reaction. Such reactions are said to be equilibrium limited.

There are a large number of reactions which fall into this category. An often used example to illustrate an equilibrium limited reaction is the oxidation of sulphur dioxide to form sulphur trioxide which proceeds in accordance with the equation:

$$SO_2 + \tfrac{1}{2}O_2 \leftrightarrow SO_3$$

In an equilibrium reaction of this type, there is an equilibrium constant $K_c$ which is normally expressed as the ratio of the concentration of the product to the starting material.

The oxidation of sulphur dioxide is a highly exothermic reaction and from the Van't Hoff equation it is possible to understand the dependence of the equilibrium constant on the temperature of the reaction. Typically Van't Hoff equation is expressed as:

$$\ln\!\left(\frac{K_1}{K_2}\right) = \frac{-\Delta H_r}{R}\!\left(\frac{1}{T_2} - \frac{1}{T_1}\right)$$

where $K_1$ is the equilibrium constant at absolute temperature $T_1$, $K_2$ is the equilibrium temperature at absolute temperature $T_2$, R is the universal gas constant and $\Delta H_r$ is the heat of reaction.

This equation illustrates that as the temperature increases the value of the equilibrium constant for an exothermic reaction decreases and hence the equilibrium position of the reaction moves towards the left. It will therefore be understood that in order to achieve a high conversion of the reactants to the products, the temperature of the reactor must be reduced sufficiently so that the equilibrium constant favours a higher concentration of the products than reactants.

For the particular equilibrium reaction of sulphur dioxide oxidation to sulphur trioxide, the equilibrium constant temperature dependence is often depicted as a chart showing the amount of sulphur dioxide converted to sulphur trioxide versus temperature. An example of this chart is illustrated in FIG. 1. Generally it is known that higher temperatures lead to higher kinetic reaction rates but since at higher temperatures the equilibrium constant favours higher concentrations of reactants, the amount of conversion to the desired products that can be achieved is limited. In the oxidation of sulphur dioxide to sulphur trioxide, the conversion rate is defined as the percentage of sulphur dioxide oxidised to the desired product. Thus as the reaction proceeds and the temperature rises, it is necessary to cool the reactants so that the equilibrium constant increases and the conversion of the sulphur dioxide is maximised.

In the conventional industrial process, simple fixed beds of catalyst are used. These beds will operate adiabatically with the temperature rising rapidly as the reactants flow across the catalyst in the bed. The result is that each bed can only perform a limited amount of oxidation before the equilibrium limit is reached. Once this point is reached, the gas has to be recovered from the adiabatic bed and cooled to move away from the equilibrium point. The cooled gas is then fed to a new fixed adiabatic bed such that further oxidation can occur. FIG. 2 illustrates a typical temperature profile for a reaction including this intermediate cooling Whilst the problem associated with equilibrium limited reaction have been discussed with reference to the oxidation of sulphur dioxide, it will be understood that the issues applies equally to any other equilibrium limited reactions such as those for the reaction of ammonia and methanol.

A further problem associated with the oxidation of sulphur dioxide is that any unreacted sulphur dioxide remaining at the end of the process represents an environmental issue that needs to be removed from the exhaust gas before this can be vented to the atmosphere. It is therefore desirable to ensure that conversion is as high as possible to minimise sulphur dioxide emissions.

The conversion of sulphur dioxide to sulphur trioxide may be achieved by passing the sulphur dioxide through a series of adiabatic beds until typically 90% to 95% of it has been converted to sulphur trioxide. Then, in order to shift the gas composition further away from the equilibrium position, the gas is cooled and scrubbed with dilute sulphuric acid. This scrubbing step absorbs the product sulphur trioxide. The resulting product lean gas stream can then be reheated and fed to one or more further reaction beds where further reaction takes place to achieve typically more than 99.7% conversion of the sulphur dioxide. This is considered to be the minimal acceptable level of conversion that allows the exhaust gas to be vented to the atmosphere without further treatment. However, it will be understood that it is necessary to cool the gas stream before it is passed to the absorber. This need for cooling, the absorber itself and the post absorption reheating adds significantly to the capital and operation costs of the process.

FIG. 3 is a schematic representation of a reactor system for this arrangement including an intermediate absorption located before the final bed. In the example illustrated, the gas fed to the first adiabatic bed 2 in line 1 will be a mixture of sulphur dioxide, oxygen and nitrogen. This is fed to the bed at a temperature of about 690K. As the gases pass over the bed, reaction occurs and about 60% to about 70% of the sulphur dioxide is oxidised. A stream of unreacted gases and the sulphur trioxide formed is removed in line 3. This stream will have been heated to a temperature of about 870K. This is then cooled in heat exchanger 4 with the heat being recovered in line 5. The gases are cooled to about 700K before being passed in line 6 to the second catalyst bed 7 where further oxidation occurs. The gas stream recovered in line 8 will contain about 90% sulphur dioxide and will have been heated to about 750K. This is then cooled in heat exchanger 9 with the heat being recovered in line 10. The gas is passed to the third catalyst bed 12 in line 11 where further reaction occurs. The gas stream recovered in line 13 will include about 95% sulphur dioxide and will be at a temperature of about 720K. This is then cooled in heat exchanger 14 before being passed to intermediate absorber 15 in which the product is recovered by being scrubbed with sulphuric acid. The unreacted sulphur dioxide is passed in line 16 to heat exchanger 17 where it is heated to about 690K before being passed to the fourth catalyst bed 19 in line 18. Further reaction is carried out in this bed and the product stream is removed in line 20 at a temperature of about 700K. About 99.9% of the sulphur dioxide will have been converted. The four reaction beds 2, 7, 12 and 19 may be located in the same reactor shell 21. In this arrangement, impervious plates 22 are located between the catalyst beds 2, 7 12 and 19 are located between the beds.

The cost implications of this approach are prohibitive where only small volumes of sulphur dioxide are to be processed. In these cases, the adopted process is to accept a lower level of sulphur dioxide conversion and to omit the intermediate absorption stage. In this approach, after the removal of the product sulphur trioxide, any remaining sulphur dioxide is removed via an end of pipe treatment system. Whilst this process does not have the high costs associated with the absorption system, the requirement to provide and operate the end of pipe treatment system does add to the costs of the process.

Whichever system is used, there is always a post reactor absorption stage in which the sulphur trioxide is absorbed into sulphuric acid. The systems which include an absorption step before the final catalyst bed are known as a 'double contact acid plant' while those with only the end of pipe treatment system are known as a 'single contact acid plant'.

Similar processing problems arise with other equilibrium reactions.

A still further problem associated with equilibrium limited reactions is that associated with the optimum reaction temperature. Adiabatic multistage reactors with intermediate cooling are used particularly where the reaction proceeds selectively to give a single product but is limited by the equilibrium conditions. As discussed above, intermediate cooling is used to displace the gas temperature in the direction of higher equilibrium conversion. In exothermic reactions, such as the production of ammonia, sulphur trioxide and methanol, the equilibrium conversion to the target product decreases with increasing temperature. This is illustrated in FIG. 4.2A in Ullmann's Encyclopedia of Industrial Chemistry, Vol B4, 1992.

For a given conversion, at low temperatures the catalyst activity is reduced and the reaction will proceed slowly. As the temperature increases, the catalytic activity increases and the reaction rate also increases. However, as the temperature approaches the equilibrium point, the reaction rate will gradually decrease until the forward reaction matches the reverse reaction and the net reaction rate reduces to zero.

A temperature can therefore be found at which the reaction rate, with respect to the product, becomes a maximum. This temperature will be below the equilibrium temperature but will not be so low that the reaction becomes too slow for the reaction to operate kinetically. These points can be plotted to form a maximum reaction rate curve which is known as the locus of optimal reaction rate or Maximum Rate Locus (MRL). This is illustrated in FIG. 4.2B in Ullmann's Encyclopedia of Industrial Chemistry, Vol B4, 1992.

In the case of adiabatic reaction control the temperature increases linearly with the achieved conversion $\Delta x$ according to the equation:

$$\Delta T = -\frac{\Delta h_g}{l_G} \cdot \frac{C_o}{C_{pG}} \cdot \Delta x$$

where each adiabatic reaction pathway of an exothermic reaction lies on a straight line of gradient $\Delta T/\Delta x$ as illustrated in FIG. 4.2A in Ullmann's Encyclopedia of Industrial Chemistry, Vol B4, 1992. A practical reaction pathway for a multistage adiabatic reaction can thus be derived from FIG. 4.2 in Ullmann's Encyclopedia of Industrial Chemistry, Vol B4, 1992 by joining straight-line sections for the adiabatic reaction to vertical lines for the temperature reduction due to indirect intermediate cooling as illustrated in FIG. 4.2C in Ullmann's Encyclopedia of Industrial Chemistry, Vol B4, 1992.

The kinetic optimum reaction pathway with the smallest required catalyst volume results when the trajectory follows, in a large number of small steps, the line of maximum reaction rate. In practice, the apparatus and equipment expenditure involved in using a large number of stages must be balanced against the savings in catalyst.

Conventional multistage reactors for this class of reaction often are limited to around three to five stages as otherwise the capital cost of the plant becomes excessive. However, it can be seen that in this case even if the capital cost is kept low a lot of the catalyst bed is operating at temperatures which are far from the optimum temperature and in the case of lower operating temperatures, the catalyst is not being fully utilised in its ability to perform the reaction. In this case, a much larger volume of catalyst is necessary which makes the cost of the catalyst higher and the size of the reactor larger.

Similar issues apply where the equilibrium reaction is an endothermic reaction.

There is therefore a need to design a process that makes maximum use of the catalyst installed within the reactor at a temperature that changes through the reactor so that as the reaction proceeds and the conversion increases, the catalyst temperature is maintained in a region where its performance is maximised.

It is further desirable to provide a process for equilibrium reactions which overcomes some or all of these problems. It has now been found that if, rather than using conventional catalyst beds, the catalyst is located within catalyst carriers, which may also be referred to as receptacles, one or more of these problems can be addressed.

Thus according to a first aspect of the present invention, there is provided a reactor having a shell comprising:
  one or more reactor tubes located within the shell, said reactor tube or tubes comprising a plurality of catalyst receptacles containing catalyst;
  means for providing a heat transfer fluid to the reactor shell such that the heat transfer fluid contacts the tube or tubes;
  an inlet for providing reactants to the reactor tubes; and
  an outlet for recovering products from the reactor tubes;
  wherein the plurality of catalyst receptacles containing catalyst within a tube comprises catalyst receptacles containing catalyst, said receptacles and/or the contained catalyst of at least two configurations.

The manner in which the configuration of the receptacles differs is discussed in more detail below. However, the main ways in which they differ relate to the type of catalyst within the receptacle, the amount of catalyst within the receptacle, the amount of heat removed from the receptacle or combinations of these.

By utilising at least two configurations of catalyst receptacles containing catalyst the reaction can be optimised such that the catalyst temperature is maintained within a region where its performance is maximised and the reaction pathway plotted as conversion versus operating temperature most closely follows the locus of optimal reaction rate. In particular, in one arrangement, the invention will allow the temperature of the reaction to be within 100° C. of the optimum temperature at a given conversion level.

By the use of a plurality of catalyst receptacles within the, or each, tube of the reactor, each tube includes a series of adiabatic beds with intermediate cooling for an exothermic reaction, or heating where the reaction is endothermic. Where there is a plurality of tubes each containing a plurality of catalyst receptacles the reactor comprises a plurality of parallel systems each including a series of adiabatic beds. By this means, the temperature profile more closely follows the Maximum Rate Locus.

The number of catalyst receptacles located with the tube will depend on the reaction being carried out and the size of the reactor used. Thus there may be from about 10 to about 100 receptacles.

In one arrangement, there will be more than two configurations of catalyst receptacles containing catalyst. In a further arrangement, there may be three, four, five, six, seven, eight, nine, ten or more configurations of catalyst receptacles containing catalyst. In a still further arrangement, each catalyst receptacle containing catalyst will be of a different configuration to each other within a respective tube. Where there are fewer configurations of catalyst receptacles containing catalyst than there are receptacles to be contained within a tube, catalyst receptacles containing catalyst of the same configuration are grouped together such that there are sets of receptacles of the same configuration which may be repeated within the tube.

Where the reaction being carried out is the production of sulphur trioxide from sulphur dioxide, it will be possible to achieve a conversion of about 99.7% or even greater than 99.7% such that the need for end of pipe treatment of the vent gas will be obviated.

Any suitable catalyst receptacle may be used. In one arrangement, the catalyst receptacle is that described in WO20111048361, the contents of which are incorporated herein by reference. In one alternative arrangement, the catalyst receptacle may be that disclosed in GB1417462.7 of 2 Oct. 2014 the contents of which are incorporated herein by reference. Thus the catalyst receptacle may comprise:
- a container comprising catalyst, said container having a bottom surface closing the container, and a top surface;
- a carrier outer wall extending from the bottom surface of said container to the top surface;
- a seal extending from the container by a distance which extends beyond the carrier outer wall;
- said carrier outer wall having apertures located below the seal.

In one arrangement, which is particularly suitable where the catalyst is a particulate or a foamed catalyst, the catalyst receptacle may comprise:
- an annular container, said container having a perforated inner container wall defining an inner channel, a perforated outer container wall, a top surface closing the annular container and a bottom surface closing the annular container;
- a surface closing the bottom of said inner channel formed by the inner container wall of the annular container.

The catalyst receptacle will generally be sized such that it is of a smaller dimension than the internal dimension of the reactor tube into which it is placed. The seal will be sized such that it interacts with the inner wall of the reactor tube when the catalyst receptacle of the present invention is in position within the reactor tube.

In use in a vertical reactor with downflow, reactant(s) flow downwardly through the reactor tube and thus first contact the upper surface of the catalyst receptacle. Since the seal blocks the passage of the reactant(s) around the side of the receptacle, the top surface thereof directs them into the inner channel defined by the inner container wall. The reactant(s) then enters the annular container through the perforated inner container wall and then passes radially through the catalyst bed towards the perforated outer container wall. During the passage from the inner container wall to the outer container wall, the reactant(s) contact the catalyst and reaction occurs. Unreacted reactant and product then flow out of the container through the perforated outer container wall. The carrier outer wall then directs reactant and product upwardly between the inner surface of the carrier outer wall and the perforated outer container wall of the annular container until they reach the apertures in the carrier outer wall. They are then directed through the apertures located in the carrier outer wall and flow downwardly between the outer surface of the carrier outer wall and the inner surface of the reactor tube where heat transfer takes place. In the event that the reactor is operated such that the flow is reversed, the path will be reversed.

The top surface of the container may be of any suitable size and configuration. In the arrangement where the receptacle comprises a perforated inner and outer container wall, the top surface will at least extend outwardly from the perforated outer container wall and will connect with the carrier outer wall. In one alternative arrangement the top surface may extend from the perforated inner container wall to the carrier outer wall. It will be understood that the top surface may be an annulus which extends from a point between the location of the perforated inner container wall and the perforated outer container wall to the carrier outer wall.

In one arrangement, a cap may close the inner channel formed by the perforated inner container wall. This cap will include one or more apertures to allow for fluid flow into the inner channel.

The size of the perforations in the inner container wall and the outer container wall will be selected such as to allow uniform flow of reactant(s) and product(s) through the catalyst while maintaining the catalyst within the container. It will therefore be understood that their size will depend on the size of the catalyst particles being used. In an alternative arrangement the perforations may be sized such that they are larger but have a filter mesh covering the perforations to ensure catalyst is maintained within the annular container. This enables larger perforations to be used which will facilitate the free movement of reactants without a significant loss of pressure.

It will be understood that the perforations may be of any suitable configuration. Indeed where a wall is described as perforated all that is required is that there is means to allow the reactants and products to pass through the walls. These may be small apertures of any configuration, they may be slots, they may be formed by a wire screen, or by any other means of creating a porous or permeable surface.

Although the top surface closing the container will generally be located at the upper edge of the inner container wall and/or the outer container wall, it may be desirable to locate the top surface below the upper edge such that a portion of the upper edge of the carrier outer wall extends above the top surface. Similarly, the bottom surface may be located at the lower edge of the inner container wall and/or the outer container wall or it may be desirable to locate the bottom surface such that it is above the bottom edge of the outer container wall such that it extends below the bottom surface. Where the carrier outer wall extends above the top and/or the bottom surface, this may facilitate the stacking of containers against others. Additionally or alternatively, this configuration may be configured to facilitate connecting the catalyst receptacle to adjacent catalyst receptacles.

The bottom surface of the annular container and the surface closing the bottom of the inner channel may be formed as a single unit or they may be two separate pieces connected together. The bottom surface of the annular container and the surface closing the bottom of the inner channel may be coplanar but in one arrangement, they are in different planes. In one arrangement, the surface closing the bottom of the inner channel is in a lower plane than the bottom surface of the annular container. This may serve to assist in the location of one catalyst receptacle onto a catalyst receptacle arranged below it. It will be understood that in an alternative arrangement, the surface closing the bottom of the inner channel may be in a higher plane that the bottom surface of the annular container. This may assist in the location of one receptacle onto a receptacle arranged below it.

In an alternative arrangement, which is particularly suitable for a monolith catalyst, the container is configured for holding a monolith catalyst.

In one arrangement, the monolith catalyst is a solid, in that there is substantially no space within the body of the monolith that is not occupied by catalyst. When the monolith is in use in a vertical reactor with downflow, the reactant(s) flow downwardly through the reactor tube, the reactant(s) first contacts the upper face of the monolith catalyst and flows therethrough in a direction parallel to the axis of the catalyst receptacle. The seal of the container prevents the reactant(s) from flowing around the monolith and assists the direction of the reactants into the catalyst. Reaction will then occur within the monolith catalyst. The product will then also flow down through the monolith in a direction parallel to the axis of the catalyst receptacle.

In the arrangement where the catalyst is a monolith catalyst, the top surface will at least extend outwardly from the monolith catalyst and will connect with the carrier outer wall. It will be understood that the top surface may be an annulus which extends over at least a portion of the monolith catalyst to the carrier outer wall.

Once the reactant(s) and product reach the bottom surface of the container they are directed towards the carrier outer wall. To facilitate this flow, feet may be provided within the container on the upper face of the bottom surface such that, in use, the catalyst monolith is supported on the feet and there is a gap between the bottom of the catalyst monolith and the bottom surface of the container. The carrier outer wall directs the reactant(s) and product upwardly between the inner surface of the carrier outer wall and the outer surface of the monolith catalyst until they reach the underside of the top surface. They are then directed by the underside of the top surface, through the apertures in the carrier outer wall and they then flow downwardly between the outer surface of the carrier outer wall and the inner surface of the reactor tube where heat transfer takes place.

In one arrangement, the monolith catalyst has a channel extending longitudinally therethrough. Generally the channel will be located on the central axis of the monolith catalyst. Thus where the reactor tube is of circular cross-section, the monolith catalyst of this arrangement will be of annular cross-section. In this arrangement, in use, in a vertical reactor with downflow, reactant(s) flow downwardly through the reactor tube and thus first contacts the upper surface of the top surface of the container and are directed into the channel of the monolith. The reactant(s) then enters the annular monolith catalyst and passes radially through the catalyst towards the outer surface of the catalyst monolith. During the passage through the catalyst monolith reaction occurs. Unreacted reactant and product then flow out of the monolith catalyst though the outer surface thereof. The carrier outer wall then directs reactant and product upwardly between the inner surface of the carrier outer wall and the outer surface of the monolith catalyst until they reach the top surface. They are then directed, by the underside of the top surface, through the apertures in the carrier outer wall and flow downwardly between the outer surface of the carrier outer wall and the inner surface of the reactor tube where heat transfer takes place.

In the arrangement in which the monolith catalyst includes the channel, the top surface may extend over the monolith catalyst but leave the channel uncovered. In another arrangement, the top surface may extend across the channel but will include apertures in this region to allow for fluid flow.

It will be understood that where the reactor is an upflow reactor or is, for example, in a horizontal orientation, the flow path will differ from that described above. However, the principle of the path through the catalyst receptacle will be as described.

As the plurality of catalyst receptacles are stacked within the reactor tube, the reactants/products flow downwardly between the outer surface of the outer wall of a first receptacle and the inner surface of the reactor tube until they contact the top surface and seal of a second catalyst receptacle and are directed downwardly into the second catalyst receptacle. The flow path described above is then repeated.

Whichever arrangement is used for the catalyst receptacle, the carrier outer wall may be smooth or it may be shaped. If it is shaped, any suitable shape may be used. Suitable shapes include pleats, corrugations, and the like. The pleats, corrugations and the like will generally be arranged longitudinally along the length of the receptacle. The shaping of the carrier outer wall increases the surface area of the carrier outer wall and assists with the insertion of the catalyst receptacle into the reactor tube since it will allow any surface roughness on the inner surface of the reactor tube or differences in tolerances in reactor tubes to be accommodated.

In configurations where apertures are present in the carrier outer wall they may be of any configuration. However, their number, size, configuration, and location will be selected to ensure that the flow of the reactant(s) and products is not impeded while ensuring the carrier outer wall has sufficient material retained to provide the required strength for load bearing. In one arrangement, the apertures may be holes or slots.

The apertures will be of any suitable size and spacing. The selection of suitable sizes will depend on the intrinsic strength of the material from which the catalyst receptacle is made, the thickness of material used, the weight and number of catalyst receptacles which are to be stacked in a reactor tube, the pressure drop noted, the length of the reactor tube, and the like. In one arrangement, the dimensions of the apertures may be different for different catalyst receptacles in a reactor tube.

Further examples of suitable catalyst receptacles are described in WO2011/048361 and WO2012/136971, the contents of each of which are incorporated by reference.

As discussed above, in the present invention the manner in which the configuration of the receptacle containing catalyst differs may be achieved by any suitable means. Suitable means include the type of catalyst within the receptacle, the amount of catalyst within the receptacle, the amount of heat removed from the receptacle, or any combination of these.

In one arrangement, the type of catalyst may be altered. Thus, for example, different catalysts may be used in different receptacles. In one arrangement, a more active catalyst may be used in receptacles in one portion of the tube than in another.

In one arrangement, the change in configuration can be the amount of catalyst loaded in the catalyst receptacle. As explained above, in an adiabatic reaction control the temperature increases linearly with the achieved conversion $\Delta x$ according to the equation:

$$\Delta T = -\frac{\Delta h_g}{l_G} \cdot \frac{C_o}{C_{pG}} \cdot \Delta x$$

Thus the adiabatic temperature rise per catalyst receptacle will be related to the conversion performed per catalyst receptacle and the amount of conversion will be related to the amount of catalyst held in the catalyst receptacle. Thus for each different receptacle containing catalyst configuration, it is possible to calculate how much catalyst to install within the catalyst receptacle so that the adiabatic temperature rise achieved maximises the use of the catalyst within the catalyst receptacle.

The different loading of the catalyst receptacle can be achieved by keeping the size of the receptacle constant and altering the amount of catalyst loading into the catalyst receptacle. In this arrangement, where the amount of catalyst required is insufficient to fill the receptacle, empty space may be left. Alternatively, the catalyst may be combined with inerts such that the receptacle is filled with a mixture of inert material and catalyst.

In the alternative, the size of the catalyst receptacle may be different between the different configurations such that the required amount of catalyst fills the respective receptacle. This can be achieved by using a receptacle having the same radial space for catalyst but being of a different length. In another arrangement, the size of the container for holding the catalyst will be of the same length and the locations of inner, outer or both inner and outer surfaces of the container can be adjusted.

Additionally or alternatively, catalyst receptacle containing catalyst may differ in the amount of heat removed from the receptacle. In preferred arrangements of catalyst receptacle, after the gas has passed through the catalyst it is passed through the annular space between the catalyst receptacle and the reactor tube into which the receptacle has been inserted. By varying the length of the carrier outer wall, which in some configurations is referred to as an upstanding skirt, and/or by varying the width of the annular space, the amount of heat removed from the gas before it is passed to the next catalyst receptacle for further reaction is varied. By varying this configuration it is possible for the reaction pathway in terms of conversion versus temperature to most closely match the locus of optimal reaction rate. This may have the benefit of minimising the total amount of catalyst which may be required to be installed within the reactor.

It will be understood that the velocity of the gas in the space between the outer wall of the catalyst receptacle and the tube wall will affect the amount of heat transfer which occurs. A higher velocity will give a higher heat transfer coefficient and hence more heat transfer will take place. A higher velocity can be achieved by reducing the size of the gap between the carrier outer wall and the inner wall of the tube. Alternatively, if less heat transfer is required then the gap between the outer surface between the catalyst receptacle and the tube wall can should be increased. Thus using receptacles of different diameters alters the gas flow around the receptacles and hence the heat transfer.

Thus in one arrangement, the catalyst receptacle length is the same between the receptacles and the outer diameter is altered between configurations to control heat transfer.

By adjusting the configuration between receptacles and/or their contents the temperature profile within the reactor more closely matches the optimum temperature profile as determined by the shape of the equilibrium curve for the particular reaction. By this means the catalyst activity can be maximised thereby minimising the volume of catalyst that is required to perform the reaction.

It should also be noted is that since the kinetic reaction rate is linked to the operating temperature, as the conversion proceeds and the equilibrium pushes the operating temperature lower and lower and the conversion per unit volume of catalyst is reduced. Since the reaction rate per catalyst volume is reducing as the operating temperature reduces then it also follows that exothermic heat released (in an exothermic reaction) per unit volume of catalyst will also reduce. Therefore as the conversion proceeds each catalyst receptacle will contain increasing amounts of catalyst, assuming that the conversion per catalyst receptacle is considered to be constant, or if the catalyst volume per receptacle is constant the amount of heat released will decrease as the conversion increases. Therefore the desired heat transfer per catalyst receptacle will decrease as the conversion increase. Thus there is a conflict between two design parameters involved in the catalyst receptacle design. As the conversion increases and the operating temperature decreases, the catalyst volume per receptacle may be increased. This may indicate that the length of the catalyst receptacle will need to increase. However, at the same time, the heat released per catalyst receptacle will be decreasing and so it would be desirable to reduce the heat transfer area by decreasing the length of the catalyst receptacle. This can be adjusted by adjusting the bed thickness by adjusting the position of the inner and outer diameters of the bed and the annular gap between the catalyst receptacle and the tube wall can also be varied to achieve the optimum reaction profile in order to maximise the reaction rate and ultimately achieve the maximum reactant conversion.

The catalyst receptacle of the present invention may include the temperature measuring arrangements described in PCT/GB2015/050214, the contents of which are incorporated by reference.

In a still further embodiment, a reactor of the present invention may be used in combination with one or more conventional adiabatic beds. Thus for example, a bulk reaction can be carried out initially in a conventional adiabatic bed as the equilibrium limit will not be reached. The stream can then be passed to a reactor in accordance of the present invention. Thus, for example, in the production of sulphur trioxide, the sulphur dioxide may be passed to a conventional adiabatic fixed bed to convert from about 60% to about 70% sulphur dioxide. This bed will be operating at least initially far from any equilibrium constraint. In this arrangement, the reactants may be passed to the adiabatic bed at a temperature which is sufficient to enable the reaction to commence. The reaction in the adiabatic bed will then cause a rise in temperature to a level where it is sufficient to be added to the reactor of the present invention.

The apparatus of the present invention is suitable for use with any equilibrium limited reaction. Thus according to a second aspect of the present invention there is provided a process for carrying out an equilibrium limited reaction comprising providing reactants to the reactor of the present invention, allowing reaction to occur and recovering product.

Examples of suitable reactions include the oxidation of sulphur dioxide to sulphur trioxide, the manufacture of ammonia, the synthesis of methanol from carbon monoxide and hydrogen, the water-gas shift reaction, the reverse water-gas shift reaction, the manufacture of styrene, the dehydration of ethylbenzene, the dehydrogenation of alkanes, methanation reactions, or steam methane reforming.

The reaction conditions, including temperature, pressure and flow rates will depend on the reaction being carried out.

Where the reaction being carried out is the oxidation of sulphur dioxide to produce sulphur trioxide using a conventional catalyst such as vanadium pentoxide, the operating pressure will generally be close to atmospheric pressure. In one arrangement the process may be operated at an inlet pressure of about 1.4 bara. Initial conversion may take place at about 600° C. to about 700° C. and as conversion progresses; the equilibrium curve moves the operating temperature to about 380° to about 420° C. Whilst the process has been described using vanadium pentoxide as the catalyst, it will be understood that any suitable catalyst may be used and that the reaction conditions may change with the catalyst selected.

The present invention will now be described, by way of example, with reference to the accompanying drawings in which:

FIG. 7 is a perspective view of a second example of a catalyst receptacle for use in the reactor of the present invention;

FIG. 8 is a perspective view of the catalyst receptacle of FIG. 7 viewed from below;

FIG. 9 is a partial cross-section of the catalyst receptacle of FIG. 7 viewed from the side;

It will be understood that the drawings are diagrammatic and that further items of equipment such as reflux drums, pumps, vacuum pumps, temperature sensors, pressure relief valves, control valves, flow controllers, level controllers, holding tanks, storage tanks, and the like may be required in a commercial plant. The provision of such ancillary items of equipment forms no part of the present invention and is in accordance with conventional chemical engineering practice.

Figure 1:
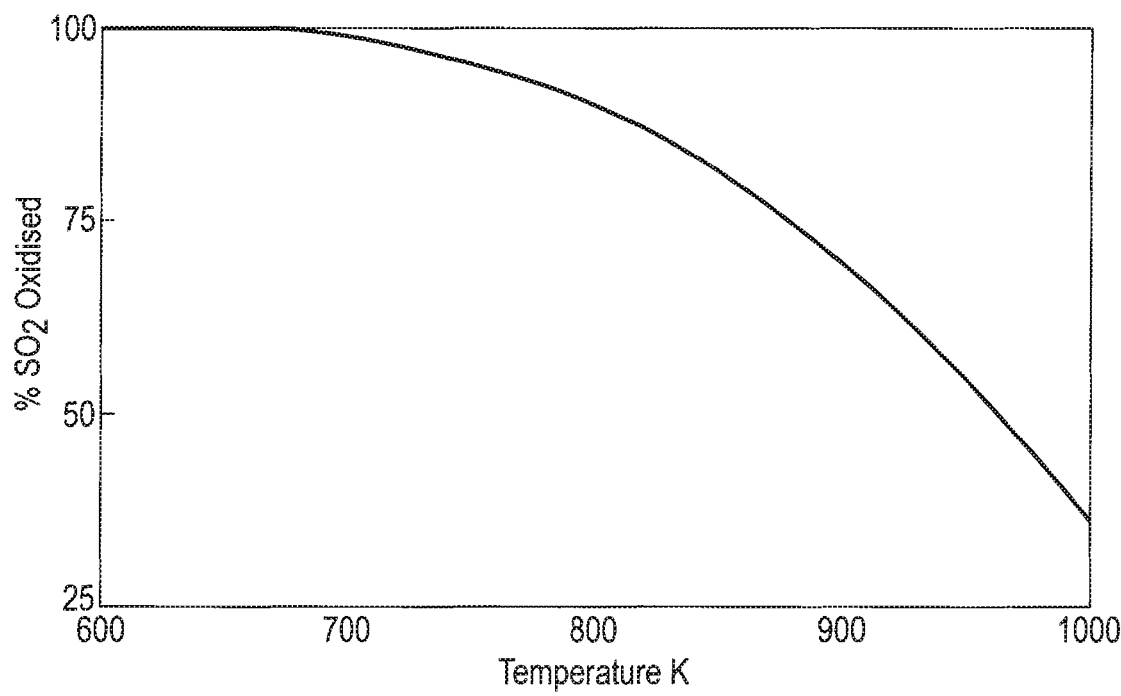
FIG. 1 is a chart illustrating the equilibrium constant dependence on temperature for the reaction of sulphur dioxide oxidation to sulphur trioxide in a conventional reaction.
Figure 2:
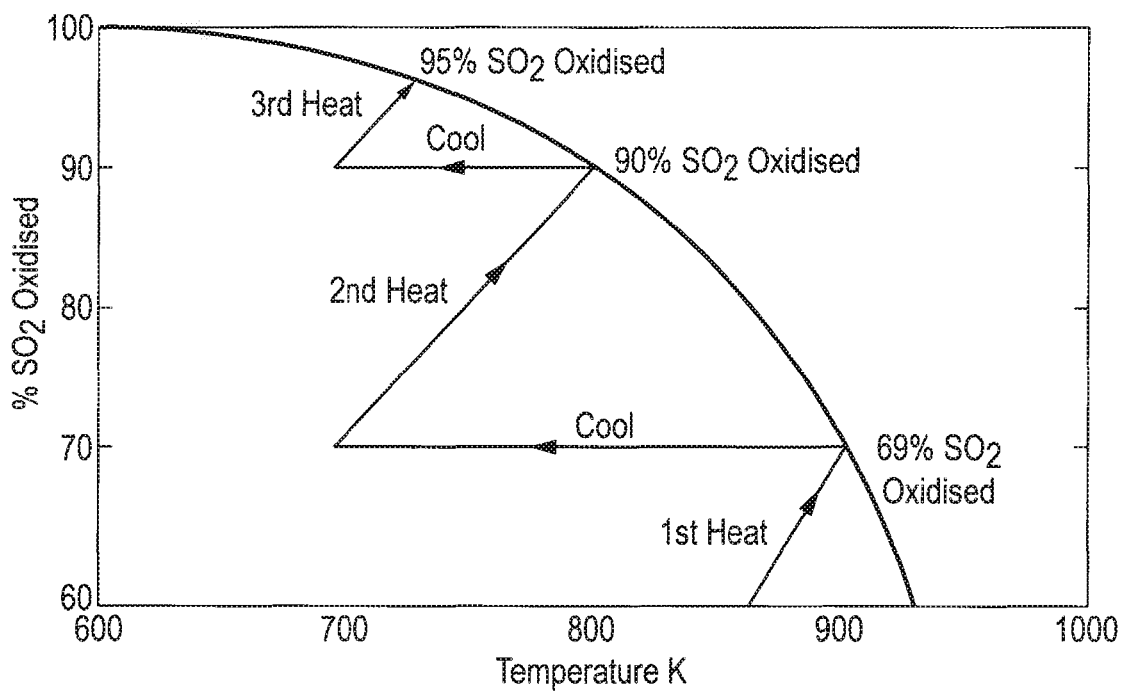
FIG. 2 is a graph illustrating a typical temperature profile for the oxidation of sulphur dioxide in a prior art process including intermediate cooling.
Figure 3:
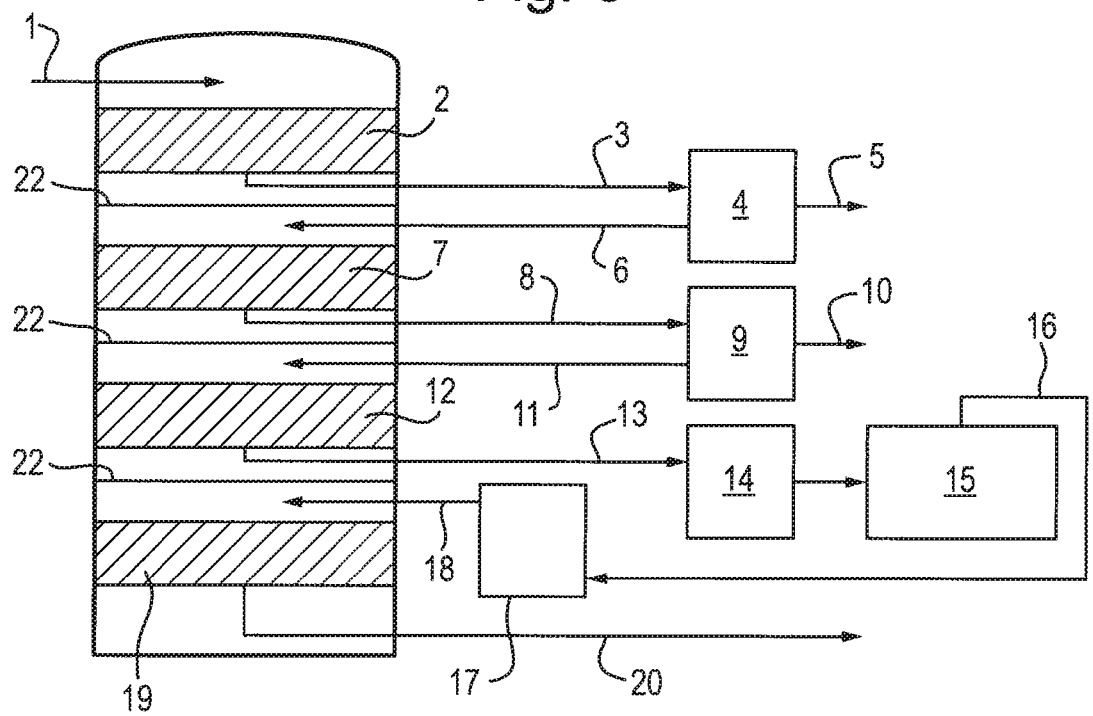
FIG. 3 is a schematic representation of a prior art reactor system.
Figure 4:
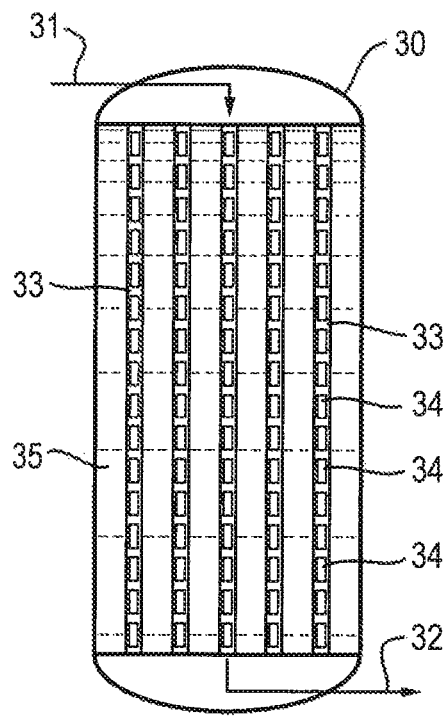
FIG. 4 is a schematic representation of a reactor in accordance with the present invention.

One example of the reactor of the present invention is illustrated in FIG. 4. The reactor comprises a shell 30 having an inlet 31 for reactants and an outlet 32 for products. The reactor includes a plurality of tubes 33. Any number of tubes may be used. The number of tubes selected will determined by the production capacity of the plant. A commercial sized plant may comprise thousands of individual reactor tubes. For ease of illustration, 5 tubes have been illustrated. The reactor will include means for mounting the tubes in position but for simplicity these have been omitted from the drawing. Similarly means for distributing the reactants throughout the tubes and collection means in the bottom of the reactants to collect the products and allow them to be collected in the outlet 32.

In use the tubes will be surrounded by a heat transfer fluid 35. Means for introducing and removing the fluid will generally be included but these have been omitted from the windows. Where the reaction to be carried out is an exothermic reaction, the heat transfer fluid will be a cooling fluid. Thus the heat transfer fluid may be any of those typically used including boiling water on the shell side raising high pressure, typically up to 100 bara, steam, heat transfer fluids such as Dowtherm or molten salt cooled reactors. Where the reaction is an endothermic reaction, the heat transfer fluid will be a heating fluid.

Each tube 33 will include a plurality of catalyst carriers which for the purposes of this application will be referred to as receptacles 34. The stack of receptacles 34 in each tube 33 will include at least two different configurations.

Figure 5:
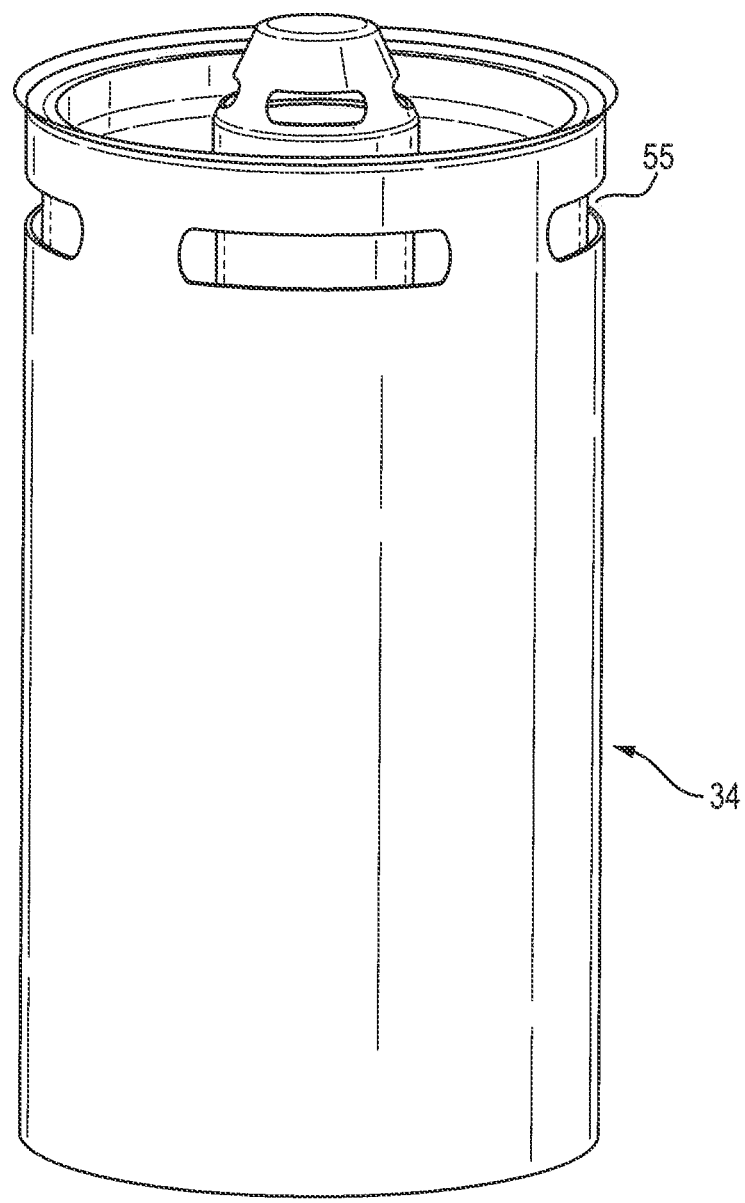
FIG. 5 is a perspective view of one example of a catalyst receptacle for use in the reactor of the present invention.
Figure 6:
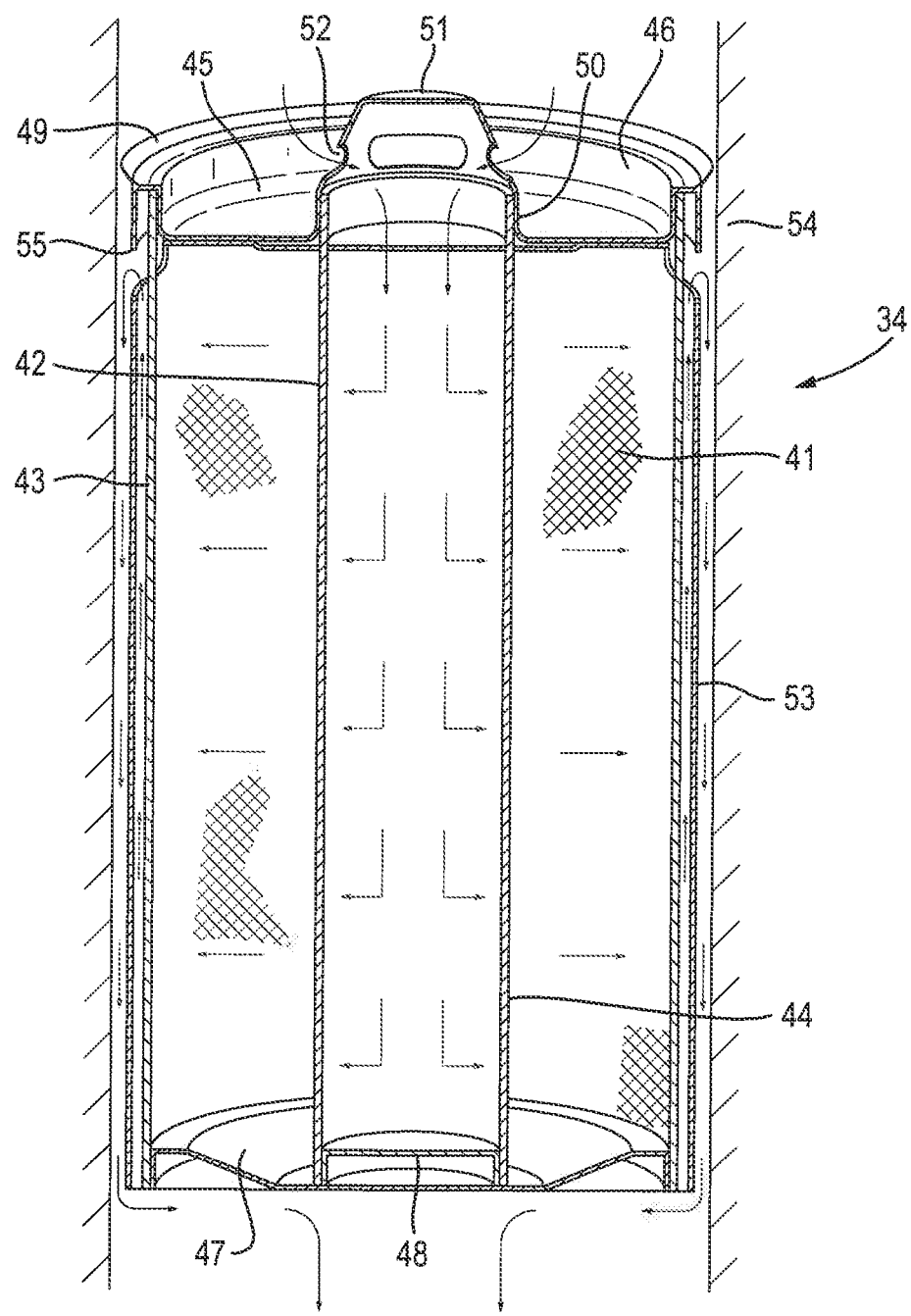
FIG. 6 is a cross section of the catalyst receptacle of FIG. 5 viewed from the side.
Figure 10:
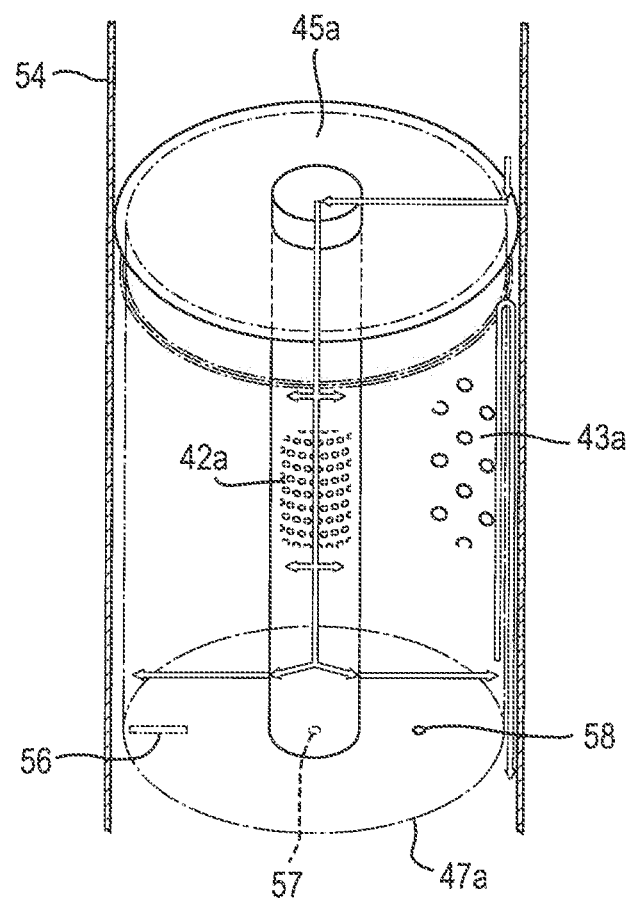
FIG. 10 is a schematic representation of the catalyst receptacle of FIG. 7 in place in a tube illustrating the flow path.

One example of a catalyst receptacle 34 which can be placed in the, or each, tube is illustrated in FIGS. 5 and 6. The receptacle 34 comprises an annular container 41 which has perforated inner and outer container walls 42, 43. The perforated wall 42 defines an inner channel 44. A top surface 45 closes the annular container at the top. It is located at a point towards the top of the inner and outer container walls 42, 43 of the annular container 41 such that a lip 46 is formed. A bottom surface 47 closes the bottom of the annular container 41 and a surface 48 closes the inner channel 44 formed by the inner container wall 42. The surface 48 is located in a higher plane that that of the bottom surface 47.

A seal 49 extends from the upper surface 45 and an upstanding collar 50 is provided coaxial with the inner channel 44.

A cap 51 closes the top of inner channel 44. Apertures 52 in the cap allow for fluid ingress.

A carrier outer wall 53 surrounds the container 41. Apertures 55 allow fluid egress from the catalyst receptacle.

The catalyst receptacle 34 is located in a reactor tube 54. The flow of gas is illustrated schematically in FIG. 6 by the arrows.

Further details of this catalyst receptacle can be found in GB1417462.7 filed 2 Oct. 2015, the contents of which are incorporated by reference.

One alternative catalyst receptacle is illustrated in FIGS. 7 to 9. This receptacle 34a comprises an annular container 41a which has perforated inner and outer container walls 42a, 43a. The perforated wall 42a defines an inner channel 44a. A top surface 45a closes the annular container 41a. It is located at a point towards the top of the inner and outer container walls 42a, 43a such that a lip 46a is formed. A bottom surface 47a closes the bottom of the annular container 41a and a surface 48a is located in a lower plane than that of the bottom surface 47a. Spacer means in the form of a plurality of depressions 56 are located on the bottom surface 47a of the annular container 42a. Drain holes 57 and 58 are located on the bottom surface 47a and the bottom surface 48a.

A seal 49a extends from the upper surface 45a and an upstanding collar 59 is provided coaxial with the inner channel 44a. A corrugated upstanding skirt 53a surrounds the annular container 41a. The corrugations are flattened in the region L towards the base of the receptacle 34a.

Figure 11:
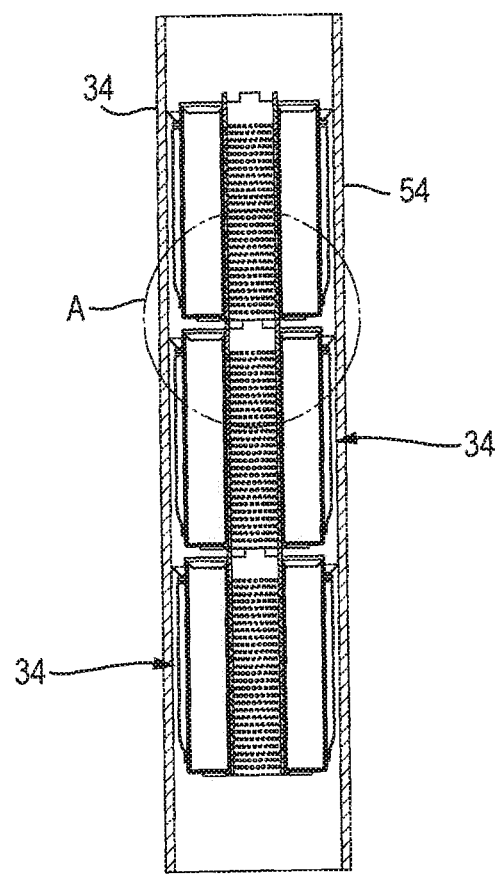
FIG. 11 is a schematic representation of a plurality of catalyst receptacle of FIG. 7 located in a reactor tube.
Figure 12:
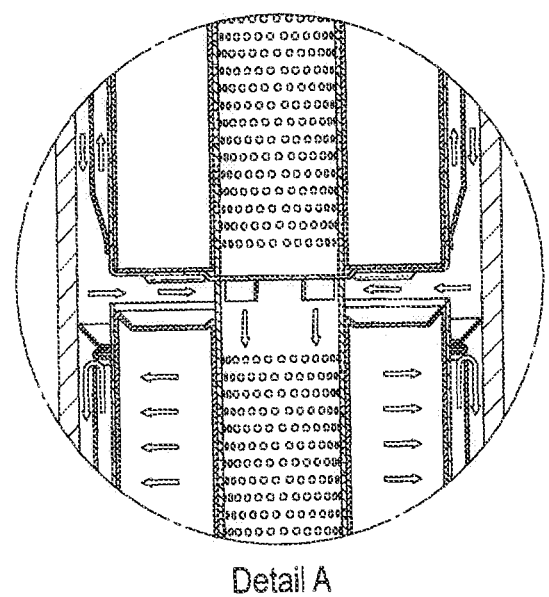
FIG. 12 is an enlarged portion of part A of FIG. 11.

When the plurality of catalyst receptacles 34 of this arrangement are located within a reactor tube 54 as illustrated in FIG. 11 the interlock. The effect on the flow path is shown in FIGS. 6 and 7. Further details of the catalyst receptacle of this arrangement are illustrated in FIG. 12 and described in WO2011/048361, the contents of which are incorporated by reference.

Whatever the arrangement of catalyst receptacle used, the present invention provides that along the length of the tube there will be at least two and usually more configurations of the catalyst receptacle itself and/or the catalyst located within the receptacle. In one arrangement, the length of the receptacle and hence the size of the annular container 41 or 41a containing catalyst will be increased. In a second arrangement, the thickness of the annular container 41 or 41a may be altered. This can be achieved by adjusting the position of the perforated inner 42, 42a and outer 43, 43a container walls. In a still further arrangement the radial size of the receptacle can be changed such that the size of the gap with the tube wall will alter at different points in the tube.

It will be understood that whilst the catalyst receptacles have been described with particular reference to a use in a tube of circular cross-section the tube may be of non-circular cross-section for example, it may be a plate reactor. Where the tube is of non-circular cross-section, the receptacle will be of the appropriate shape. In this arrangement, in the embodiment described in which an annular monolith is used it will be understood that the monolith will not be a circular ring and this term should be construed accordingly.

The present invention will now be described by way of example with reference to the production of sulphur trioxide by the oxidation of sulphur dioxide.

COMPARATIVE EXAMPLE 1

In this example, the reactor tubes are loaded with identical catalyst receptacles. The selection of the design of the receptacle has to be a compromise between ensuring sufficient reaction takes place to achieve the desired conversion whilst ensuring that the discharge temperature from the tubular reactor is sufficiently low to meet the equilibrium temperature that determines the overall conversion of $SO_2$ to $SO_3$.

In this example, a target conversion of 99.5% was selected. Since the equilibrium temperature to achieve this conversion is around 390° C., the gas discharging from the reactor must be at a lower temperature than this if the desired conversion is to be achieved.

Based on this the following inlet conditions were set for the tubular reactor:

| | |
|---|---|
| Inlet temperature | 420° C. |
| Inlet pressure | 1.4 bara |
| Inlet $SO_2$ concentration | 11% vol |
| $SO_2$ conversion to $SO_3$ | 99.5% |
| Required catalyst volume | 36 m³ |
| Reactor Design | |
| Number of zones | 1 |
| (Each zone is defined as containing the same design of catalyst receptacle) | |
| Reactor diameter | 7 m |
| Tube Length | 30 m |
| (Due to limitations on overall tube length this is likely to require a minimum of 2 or possibly 3 reactors in series) | |
| Average deviation from MRL | 90° C. (This is defined below) |
| Max. deviation from MRL | 120° C. |

Figure 13:
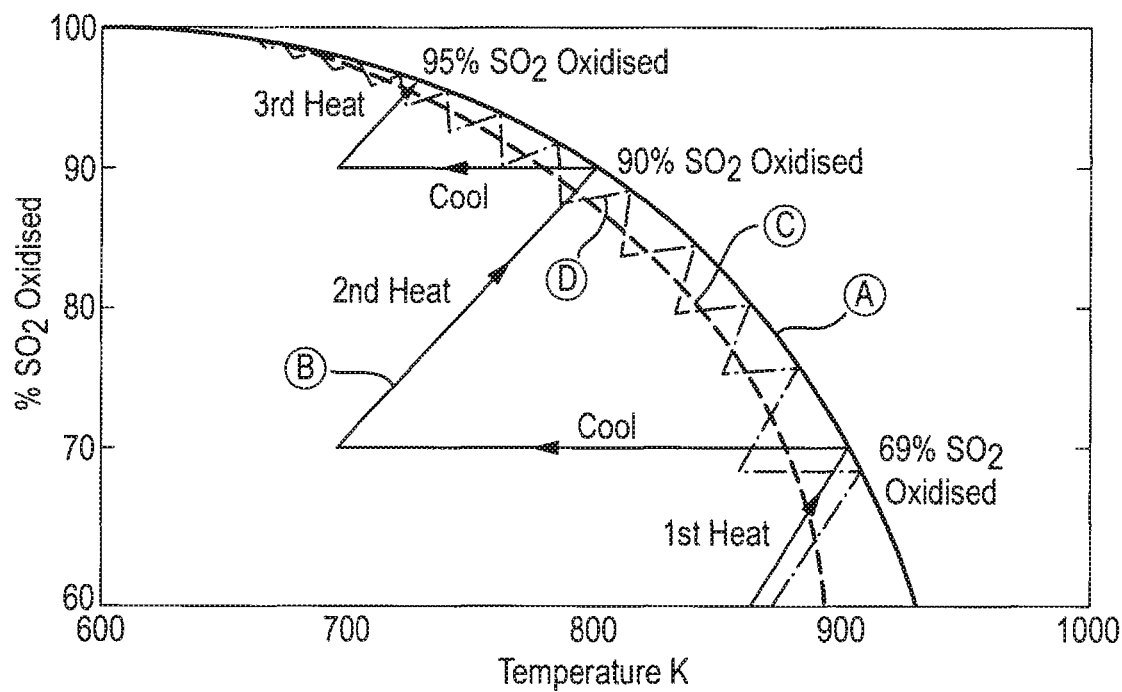
FIG. 13 is a graph illustrating the benefits of the present invention.

As discussed above, for equilibrium limited reactions, it is possible to calculate the optimum reaction pathway that maximises the reaction rate as the conversion progresses. This is typically plotted as conversion versus temperature so as the conversion progresses the operating temperature that gives the maximum kinetic reaction rate can be read from such a chart (this is shown in FIG. 13 as a dashed line). This optimum temperature is known as the Maximum Rate Locus (MRL).

There may be different means of characterising the efficiency of the reaction in terms of how well the catalyst is utilised. The maximum efficiency would be achieved if the reaction temperature through the reaction ideally matched the MRL. In reality there will always be some catalyst operating at temperatures above and below the MRL and this will represent an efficiency loss since the kinetic reaction rate per unit volume of catalyst will reduce the further away from the MRL that the catalyst is operated.

For the catalyst receptacles there is an inlet temperature to each catalyst bed within the receptacle and an exit temperature, it is therefore necessary to adopt as a measure of catalyst utilisation efficiency the average of the absolute value of deviation of the inlet and exit temperature for each catalyst bed from the optimum temperature determined by the MRL.

Thus, where a single design of catalyst receptacle is used throughout the reactor, the average deviation of the absolute values of the inlet/exit temperatures (on an absolute basis) from the optimum value relevant to the conversion at that point in the reactor is 90° C.

As illustrated in FIG. 13, the diagonal lines which show the operating temperature versus the conversion could be +/−90° C. Again the maximum temperature for a given conversion will be limited by the equilibrium temperature and the difference between MRL and equilibrium temperature may be lower than 90° C., so depending on position in the reactor the temperature deviation may be +30° C./−120° C. for example.

EXAMPLE 2

Example 2 is similar to Comparative Example 1 except that the reactor contains several zones of catalyst receptacles, the design of receptacle in each zone is optimised to ensure that the temperature rise per catalyst bed and the temperature drop achieved during the heat transfer to the shell-side of the reactor are such that the catalyst volume required is optimised by ensuring that the catalyst operates as close to the optimum temperature as possible.

The following inlet conditions were set for the tubular reactor:

| | |
|---|---|
| Inlet temperature | 420° C. |
| Inlet pressure | 1.4 bara |
| Inlet $SO_2$ concentration | 11% vol |
| $SO_2$ conversion to $SO_3$ | 99.5% |
| Required catalyst volume | 19 m³ |
| Reactor Design | |
| Number of zones | 4 |
| (Each zone is defined as containing the same design of catalyst receptacle) | |
| Reactor diameter | 7 m |
| Tube Length | 7 m |
| (This will be possible in a single tubular reactor) | |
| Average deviation from MRL | 26° C. |
| Max. deviation from MRL | 80° C. |

It can therefore be seen how operating much closer to the MRL achieves greater utilisation of the catalyst and therefore reduces the required catalyst volume for a certain production volume.

The table below details the design of catalyst receptacles in a tube used in Example 2

| | Inlet | | | Exit |
|---|---|---|---|---|
| | Zone | | | |
| | 1 | 2 | 3 | 4 |
| Catalyst receptacle length (mm) | 125 | 150 | 150 | 150 |
| Catalyst volume (cm³) | 10 | 20 | 40 | 100 |
| Number of cans | 5 | 5 | 10 | 20 |
| Annulus in catalyst receptacles (for heat transfer) (mm) | 3 | 5 | 8 | 8 |

The invention claimed is:

1. A process for carrying out an equilibrium limited reaction having a Maximum Rate Locus defining temperature at which the equilibrium limited reaction has a maximum reaction rate with respect to a product of the equilibrium reaction as a function of conversion, the process comprising
providing reactants to a reactor having a shell comprising
one or more reactor tubes located within the shell, said reactor tube or tubes comprising a plurality of catalyst receptacles containing catalyst;
means for providing a heat transfer fluid to the reactor shell such that the heat transfer fluid contacts the tube or tubes;
an inlet for providing reactants to the reactor tubes; and
an outlet for recovering products from the reactor tubes;
allowing reaction to occur, and recovering product,
wherein the plurality of catalyst receptacles containing catalyst within a tube comprises catalyst receptacles containing catalyst of at least two configurations such that reaction temperature as a function of conversion in the reactor is within 100° C. of the Maximum Rate Locus.

2. The process according to claim 1, wherein the process is oxidation of sulphur dioxide to sulphur trioxide, manufacture of ammonia, synthesis of methanol from carbon monoxide and hydrogen, water-gas shift reaction, reverse water-gas shift reaction, manufacture of styrene, dehydration of ethylbenzene, dehydrogenation of alkanes, methanation reactions, or steam methane reforming.

3. The process according to claim 1, wherein the reaction being carried out is the oxidation of sulphur dioxide to produce sulphur trioxide, and wherein the reaction is operated at an inlet pressure of about 1.4 bara, with initial conversion taking place at about 600° C. to about 700° C. and as conversion progresses, the temperature reduces to about 380° to about 420° C.

4. The process according to claim 1, wherein the catalyst receptacles containing catalyst differ in type of catalyst within the receptacle, amount of catalyst within the receptacle, amount of heat removed from the receptacle, or combinations thereof.

5. The process according to claim 1, wherein the catalyst receptacles containing catalyst allow, in use, the temperature of the reaction to be within 100° C. of the equilibrium temperature at a given conversion level.

6. The process according to claim 1, wherein there are three, four, five, six, seven, eight, nine, or ten different configurations of catalyst receptacles containing catalyst.

7. The process according to claim 1, wherein the catalyst receptacle comprises:
a container comprising catalyst, said container having a bottom surface closing the container, and a top surface;
a carrier outer wall extending from the bottom surface of said container to the top surface;
a seal extending from the container by a distance which extends beyond the carrier outer wall;
said carrier outer wall having apertures located below the seal.

8. The process according to claim 1, wherein the catalyst receptacle comprises:
an annular container, said container having a perforated inner container wall defining an inner channel, a perforated outer container wall, a top surface closing the annular container, and a bottom surface closing the annular container;
a surface closing the bottom of said inner channel formed by the inner container wall of the annular container.

9. The process according to claim 1, wherein the at least two configurations of catalyst receptacles containing catalyst comprises the use of different catalysts.

10. The process according to claim 1, wherein the at least two configurations of catalyst receptacles comprises a change in the amount of catalyst loaded in the catalyst receptacle.

11. The process according to claim 10, wherein the change in the amount of catalyst loaded in the catalyst receptacle is achieved by altering the amount of catalyst loaded into the catalyst receptacle and filling the receptacle with inert material.

12. The process according to claim 10, wherein the change in the amount of catalyst loaded in the catalyst receptacle is achieved by altering the length of the receptacle.

13. The process according to claim 1, wherein the at least two configurations of catalyst receptacles comprises altering the diameter of the carrier such that when it is loaded into a tube, the annular space between the catalyst receptacle and the reaction tube into which it is to be inserted is altered.

14. The process according to claim 1 using a reactor system comprising the reactor used in combination with one or more conventional adiabatic beds.

15. The process according to claim 14, wherein the reactor system is configured such that a bulk reaction can be carried out initially in a conventional adiabatic bed before being passed to the reactor.

\* \* \* \* \*